United States Patent Office 3,310,483
Patented Mar. 21, 1967

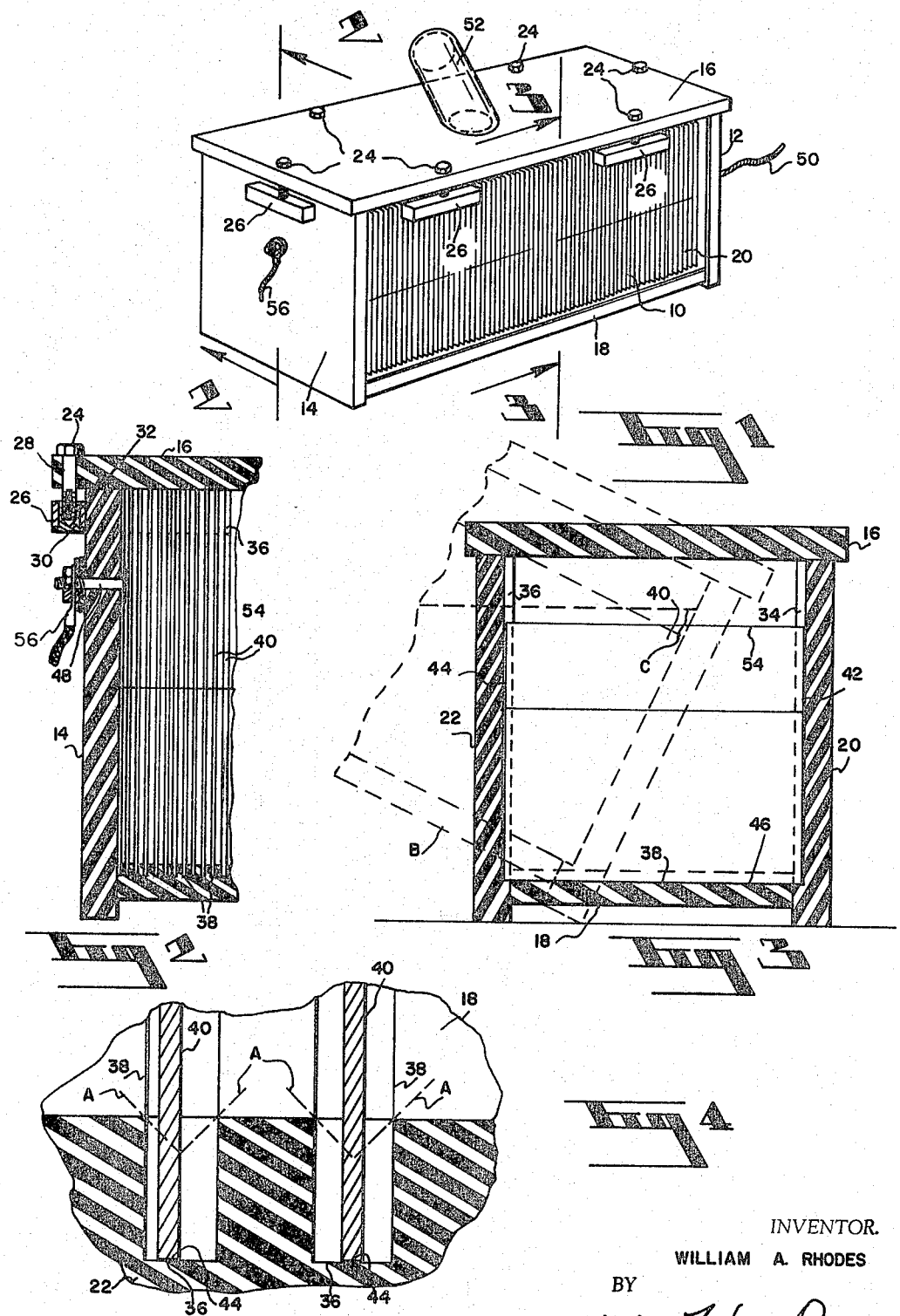

3,310,483
MULTICELL OXYHYDROGEN GENERATOR
William A. Rhodes, 4421 N. 13th Place,
Phoenix, Ariz. 85014
Filed Nov. 22, 1963, Ser. No. 325,689
1 Claim. (Cl. 204—268)

This invention relates to a multicell oxyhydrogen generator and more particularly to a multicell oxyhydrogen generator employing a plurality of spaced plates operating electrically in series with each other and an electrolyte therebetween.

Heretofore, multicell oxyhydrogen generators having a plurality of spaced plates operating electrically in series with each other and with an electrolyte have been constructed in a manner to insulate all of the plates from each other to seal the edges of the plates to a housing to prevent electrical short-circuiting around the edges of the plates and through the electrolyte.

Such generator construction has created many mechanical complexities and sealing problems and has, additionally, further complicated the problem of maintaining a constant level of the electrolyte in all of the series operated cells. Additionally, the problem of adding makeup fluid to all of the cells and equalizing the addition and/or resultant concentration of the electrolyte has been difficult to solve.

Accordingly, it is an object of the present invention to provide a very simple multicell oxyhydrogen generator wherein a plurality of electrode plates are operated electrically in series in a tank of dielectric material having slots holding the edges of the plates; said slots being sufficiently deep to prevent short-circuiting of electrical current around the edges of the plates, thus, solving the usual sealing problem.

Another object of the invention is to provide a very simple multicell oxyhydrogen generator wherein a plurality of electrolizing plates are operable in series with each other and with an electrolyte, thereby obviating the necessity of utilizing a step-down transformer to obtain the desired electrolizing voltage.

Another object of the invention is to provide a multicell oxyhydrogen generator wherein a novel dielectric container holds electrodes in such a manner as to obviate the necessity of utilizing electrical insulation between the electrolizing plates and to provide a substantially continuous conductive body of plates and electrolyte in series from one electrode at one end of the generator to an electrode at the opposite end of the generator.

Another object is to provide a very novel multicell oxyhydrogen generator employing a plurality of spaced electrolizing plates operable in an electrolyte and in electrical series with each other and the electrolyte whereby one surface of each plate produces hydrogen gas and the opposite surface of the plate produces oxygen gas.

Another object of the invention is to provide a novel multicell oxyhydrogen generator wherein a plurality of electrolizing plates are disposed in spaced series with relation with each other and an electrolyte and wherein novel means is provided for periodic makeup of feed water to be added to all of the cells at an even and equal capacity.

Another object of the invention is to provide a novel multicell oxyhydrogen generator having a plurality of spaced electrolizing plates separating respective cells therebetween and wherein the upper edges of the plates may be overrun by the electrolyte simply by tilting the generator until the electrolyte overruns the upper edges of the plates so that equalization of the volume of fluid between the plates and in the cells may be accomplished.

Another object of the invention is to provide a multicell oxyhydrogen generator having novel oxygen and hydrogen production and mixing directly from opposite sides of each of the electrolizing plates in the generator and for carrying the combined gases into a common duct properly mixed for combustion.

Another object of the invention is to provide a multicell oxyhydrogen generator having a plurality of spaced plates and adjacent cells, each plate acting as an electrode for each side of each cell, each electrode being the electrolysis means for both hydrogen and oxygen gases in both adjacent chambers of liquid in contact thereto.

Another object of the invention is to provide a novel multicell oxyhydrogen generator having a tank composed of electrical insulation material wherein edges of electrolizing plates are contained in grooves in the side walls and the bottom of the tank and wherein each groove in the electrolyte tank in which electrode plate rests is sufficiently deep in relation to the electrode plate thickness that the electrical current flowing through the cross section of each chamber or cell finds a shorter and preferred path by passing through the metal of the plate instead of passing through the electrolyte around the edge of the plate.

Another object of the invention is to provide a multicell oxyhydrogen generator wherein a tank is composed of insulation material and provided with grooves in the side walls and the bottom thereof; said grooves being spaced from each other, such that plates at their vertical and lower edges are loosely contained in the grooves in the tank, thereby providing a very simple multicell oxygen and hydrogen generating apparatus.

Further objects and advantages of the invention may be apparent from the following specification, appended claim and accompanying drawings, in which:

FIG. 1 is a perspective view of a multicell oxyhydrogen generator in accordance with the present invention;

FIG. 2 is a fragmentary sectional view of one end of the generator taken from the line 2—2 of FIG. 1;

FIG. 3 is a cross sectional view of the generator taken from the line 3—3 of FIG. 1 and showing by broken lines the tilting of the generator tank whereby electrolyte reaches a level above upper edges of the plates to thereby equalize the total volume of electrolyte in all of the series arranged cells; and FIG. 4 is an enlarged fragmentary cross sectional view of a pair of spaced electrolizing plates of the invention having their edges contained in slots in the side structure of the insulating tank of the invention and wherein electrolysis takes place upon opposite sides of the plate to produce oxygen on one side and hydrogen on the other and wherein the edges of the plates are projected a sufficient distance inwardly of the said slots to prevent short-circuiting of the electrical current around the edges of the electrolizing plates.

As shown in FIG. 1 of the drawings, the multicell oxyhydrogen generator of the present invention comprises a generally rectangular tank 10 composed of end walls 12 and 14, a top 16, a bottom 18 and side walls 20 and 22.

The end walls 12 and 14 and the bottom and side walls 18, 20 and 22 are all integral or fused together and are made of electrical insulation material, such as Lucite or the like. The top 16 is connected to the sides and ends by bolts 24 which extend downwardly through openings in the top 16 and into blocks 26 connected respectively to the sides and ends of the tank.

Referring to FIG. 2 of the drawings, it will be seen that a bolt 24 extends downwardly through an opening 28 in the top 16 and that the bolt 24 is screwthreaded in a metal bushing 30 in one of the blocks 26 which is fused or otherwise secured to the end wall 14.

In some instances, the material of the side walls, end walls and bottom, may be Lucite or other equivalent insulating material forming a float type container.

The cover 16 is provided with a recessed gasket 32 which bears on the upper edges of the side and end walls, as shown in FIG. 2 of the drawings, to provide a gas seal at the upper end of the tank.

The side walls 20 and 22 are provided with spaced slots 34 and 36, as shown on the enlarged scale in FIG. 4 of the drawings. The bottom 18 is provided with similar slots 38, these slots as shown in FIG. 2 of the drawings, are spaced from each other and electrolizing plates 40 are provided with edges 42, 44 and 46 disposed respectively in the slots 34, 36 and 38 of the sides 20 and 22 and the bottom 18.

The slots 34, 36 and 38 are all of substantially similar depth and correspond structurely to the description which will be hereinafter made in connection with FIG. 4 of the drawings.

As an example, the plates may be eighteen thousandths of an inch thick and the slots may be 32 thousandths of an inch wide. These dimensions may be varied in proportion to the size of the apparatus required and are only given by way of an example.

The plates 40 may be any suitable material known in the art for the purpose of electrolizing a conventional electrolyte to produce hydrogen and oxygen, as will be hereinafter described.

Referring to FIG. 4 of the drawings, it will be seen that the slots 36 contain the edges 44 of the plates 40 and that these edges project a sufficient distance into the slots 36 so that electrolysis indicated generally by broken lines A limited to a median angle on substantially 45 degrees will not pass the edges 44, but will complete the electrical circuit through the plate 40 without a tendency of short-circuiting around the edges 44 In this manner the plates 40 and the electrolyte therebetween are forced to operate as a continuous conductor with the plates in series thereby obviating the necessity of using a step down transformer. As for example, when 120 volts alternating current is used in connection with a conventional half-wave or a full-wave rectifier, direct current of the order of 120 volts or more, when operating in series through 60 or more of the plates 40 is reduced to substantially two volts at each plate which is a desired electrolyzing voltage. The plates operate in series by reason of an electrical connection provided by a conductor 56 having a clamp terminal 48 coupled to one of the plates 40 adjacent the end plate 14 while another conductor 50 is coupled to a similar plate 40 adjacent to the end plate 12. Thus, the circuit is completed through the plates 40 in series with each other and with the electrolyte therebetween.

A particularly novel feature of the present invention is the construction of the tank holding the electrolyte and particularly the construction of this tank of insulating material and providing it with the plate edge holding slots wherein the plates are loosely supported and wherein the slots are sufficiently deep to prevent short-circuiting of the electrical energy around the edges of the plates. Thus, each electrolizing plate 40 is caused to operate in series with the other plates and to produce oxygen on one surface and hydrogen on the opposite surface.

In the top 16, a conduit 52 is provided to communicate with the interior of the tank below the cover 16 and above the upper edges 54 of the plates 40. The electrolyte is disposed in the tank below the upper edges 54 of the plates and the level of the electrolyte in the tank may be varied to vary the effective area of the plates which correspondingly relates to power consumption and the amount of gas yield of the generator.

When it is desired to add makeup water, it may be poured through the conduit 52 and the tank may be tilted as indicated by broken lines B in FIG. 3 of the drawings, so that the electrolyte level is disposed at C above upper edges 54 of the titled plates 40. Thus, the electrolyte volume between each adjacent plate and in each cell is equalized.

The generator of the present invention when operated produces hydrogen and oxygen gas from opposite sides of each of the plates 40 and these gases rise and mix intimately at the upper edges 54 of the plates and may be carried outwardly through the conduit 52 or any other suitable conduit to a use location, such as a torch or other combustion means.

It will be obvious to those skilled in the art that various modifications of the present invention may be resorted to in a manner limited only by a just interpretation of the following claim.

I claim:

In a multicell oxygen and hydrogen generator the combination of: a tank adapted to contain electrolyte and of electrical insulating material; said tank having side and bottom walls provided with parallel, spaced slots; a plurality of parallel electrolizing plates disposed in said slots and loosely contained therein forming compartments therebetween the edges of said plates extending into said slot portions a sufficient distance whereby electrolysis acting at approximately 45 degrees to the edges of said slots intersect said plates inwardly of the edges thereof, thereby electrolizing through said plates and preventing short-circuiting through the electrolyte around the edges of said plates; an electrode adjacent each of the opposite end walls of said tank adapted to communicate with electrolyte adjacent said plates and adapted to conduct direct current to act in series with said plates and electrolyte in the compartments therebetween; a cover sealed to the upper portion of said tank and having an outlet for a mixture of hydrogen and oxygen gases; upper edges of said plates spaced substantially below said cover forming a gas collecting chamber above said plates whereby tilting of said tank may cause electrolyte therein to pass above upper edges of said plates and equalize the volume of fluid in said compartments throughout said tank, communication between said compartments being limited to said gas collecting chamber.

References Cited by the Examiner

UNITED STATES PATENTS

| 1,397,735 | 11/1921 | Holland | 204—269 |
| 1,415,466 | 5/1922 | Pechkranz | 204—254 |
| 1,579,138 | 3/1926 | Petz | 204—256 |

FOREIGN PATENTS

| 13,723 | 1893 | Great Britain. |

JOHN H. MACK, *Primary Examiner.*

D. R. JORDAN, *Assistant Examiner.*